Feb. 6, 1945.　　A. M. DINKFELD　　2,368,975
MOLDING AND CURING SELF-SETTING MAGNESIA

Filed June 30, 1942

INVENTOR
AUGUST M. DINKFELD.
BY
ATTORNEY

Patented Feb. 6, 1945

2,368,975

UNITED STATES PATENT OFFICE 2,368,975

MOLDING AND CURING SELF-SETTING MAGNESIA

August M. Dinkfeld, Berkeley, Calif., assignor to Johns-Manville Corporation, New York, N. Y., a corporation of New York Application June 30, 1942, Serial No. 449,164

4 Claims. (Cl. 25—154)

This invention relates to magnesia insulation, and is particularly directed to a method of molding and curing magnesia insulation blocks and other shapes to produce a shape of low density and smooth surface which requires no cutting or trimming to bring it to the required dimensions.

A principal object of the present invention is to provide an improvement in the curing of molded or cast self-setting magnesium carbonate shapes in such a way as to effect conversion to the basic carbonate within the mold without developing surface distortion or undesirable gas pores and cracks within the material undergoing cure.

To produce magnesia insulation shapes of comparatively low density, it has heretofore been considered necessary to mold a mixture of asbestos or other reinforcing fibres, water, and normal self-setting magnesium carbonate in open top pan molds under substantially atmospheric pressure. The thus-shaped product is then converted to basic carbonate by heat curing before removal from the mold to develop the necessary wet strength or preliminary set. That surface of the molded product which is exposed to the surrounding atmosphere during the curing operation is rough and uneven, apparently as the result of the "heaving" and distortion of the mold charge and comparatively rapid liberation of $CO_2$.

Another object of the present invention is to provide an improved method whereby such low density magnesia insulation shapes may be molded and cured to substantially precise dimensions without developing structural weaknesses or serious imperfections on any surface.

With the above and other objects and features in view, the invention consists in the improved method of molding and curing low density magnesia insulation shapes, which is described and more particularly defined by the accompanying claims.

Figure 1:
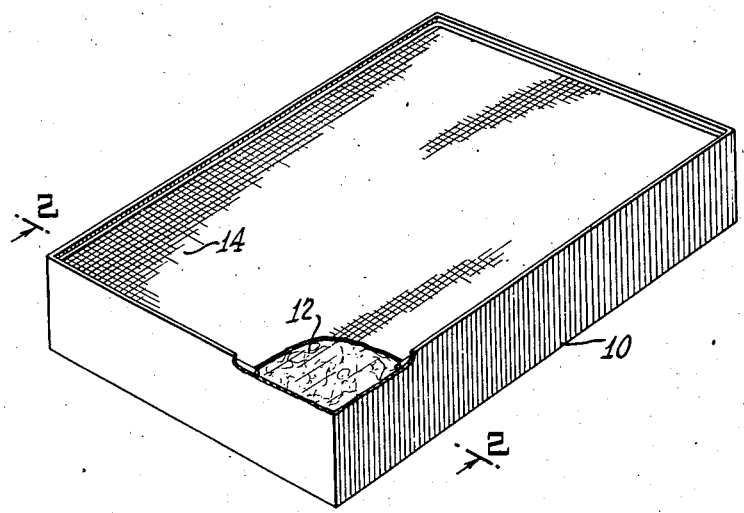
Figure 2:
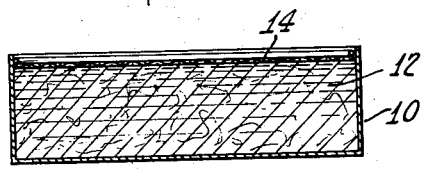

In the following description reference will be made to the attached drawing, in which: Fig. 1 is a perspective view of an open top pan mold filled with a charge of self-setting magnesium carbonate, showing the top surface of the mold charge confined by a gas pervious and solids impervious screen (with corner sections of the mold and screen broken away to show the charge); and Fig. 2 is a view in vertical section of the filled mold shown in Fig. 1.

According to the present invention, it is possible to mold and cure to precise dimensions an asbestos or other fibre-reinforced magnesia insulation shape when producing shapes of ample strength having a density as low as 8–12 lbs. per cubic foot.

The method forming the subject of the invention will be described with particular reference to the molding and curing of a suitably proportioned mixture of normal magnesium carbonate and asbestos fibres. It will be understood that the invention has general application to the molding and curing of self-setting magnesium carbonate mixtures containing other reinforcing materials including mineral wool and organic fibres. In preparing a slurry of castable consistency, a dilute aqueous suspension of finely divided hydrated magnesia may be carbonated under conditions to produce normal magnesium carbonate ($MgCO_3$—$3H_2O$) directly, or else a solution of magnesium bicarbonate may be heated under conditions to produce the normal carbonate. Asbestos fibres may be added to the hydrated magnesia or bicarbonate before the treatment converting to normal carbonate, or the asbestos may be added after formation of the normal carbonate slurry. The slurry thus formed is then dewatered to a suitable molding consistency. In preparing the slurry, the treatment should be such as to convert at least a substantial proportion of the magnesia content to normal or hydrated self-setting magnesium carbonate.

Following the step of adjusting the slurry to a suitable consistency, which may preferably be in the range 8–18 parts by weight of solids, the slurry may be introduced into an open-top pan mold 10 until the mold is filled. The invention is not, however, limited to the use of the usual pan mold. When filling the mold, care should be taken to see that there is substantial uniformity in distribution of reinforcing fibres and solids throughout all sections of the mold. In some cases it is advisable to effect gentle agitation of the mold charge during the charging period.

As soon as the mold is filled, the top or any exposed surface of the charge 12 is covered with a finely woven metal or fabric screen 14 preferably having a mesh not substantially coarser than 20 x 20 to the square inch. A screen having a coarser mesh than indicated has been found ineffective to produce a cured shape of suitable smooth surface and uniform structural porosity and strength. A finer screen, such as Dutch weave Monel metal gauze of 28 x 500 to the inch mesh, has been found entirely satisfactory in producing by normal hot air curing methods a shape having a smooth, hard, non-dusting surface and a uniform internal structure of satisfactory strength and rupture-modulus. With the screen in place, the mold charge is completely enclosed by pervious and impervious walls.

After the fine mesh screen has been applied to the open top or other exposed surface of the mold and of the mold charge, the charge is given a preliminary setting or curing treatment before removal from the mold by heating in a drying oven under substantially atmospheric pressure at a temperature of preferably 170–180° F. It has been found that all of the peripheral surfaces of blocks or other shapes thus molded and cured, including the surface formed in contact with the fine mesh screen, are smooth, hard, and non-dusting. Furthermore, the internal structure of the cast and cured product has a substantially uniform strength and porosity and is free from large gas pockets and stress cracks. The gauze or other fine mesh screen apparently operates to develop a smooth surface on the product by preventing creeping of fibres or carbonate crystals away from the crystal structure during the preliminary setting period when there is a tendency for rapid liberation of gas. The gauze or screen permits the escape of $CO_2$ liberated during the preliminary setting period and at the same time inhibits any "heaving" or distortion of the mold charge or displacement of solids from the surface in contact therewith.

A block or shape is produced having hard, substantially smooth surfaces on all sides, so that no cutting or trimming is necessary; and the block is cast to precise predetermined dimensions. Apparently the use of the screen in the way indicated also insures that the cured shape shall have substantially homogeneous porosity, without the development of large pores or gas pockets.

What I claim is:

1. In curing pan cast shapes of self-setting magnesium carbonate slurry, the step comprising, heating the slurry charge within the pan while permitting escape of gas from, and preventing displacement of solids at, any surface of the charge directly exposed to the surrounding atmosphere.

2. In molding and curing self-setting magnesium carbonate slurry to produce shapes of precise dimensions having substantially smooth, non-dusting surfaces, the steps comprising, filling a mold having at least one opening with a charge of slurry of castable consistency, and heat curing the charge while retained within the mold under substantially atmospheric pressure and while permitting escape of gas from, and preventing displacement of solids at, any surface of the charge directly exposed to the surrounding atmosphere.

3. The method of molding and curing self-setting magnesium carbonate as defined in claim 2, including the step of gently agitating the mold charge during the charging period.

4. In the method of producing from a slurry a molded magnesium carbonate product of low density having substantially smooth, non-dusting and plane surfaces, the step of controlling the surface characteristics which comprises having the slurry set while confining it within a mold under substantially atmospheric pressure and while permitting escape of gas from, and preventing displacement of solids at, any surface of the charge directly exposed to the surrounding atmosphere.

AUGUST M. DINKFELD.